United States Patent
Kumar et al.

(10) Patent No.: US 6,604,195 B1
(45) Date of Patent: Aug. 5, 2003

(54) METHOD AND APPARATUS TO USE NON-VOLATILE READ/WRITE MEMORY FOR BOOTSTRAP CODE AND PROCESSES

(75) Inventors: Jainendra Kumar, Fremont, CA (US); Joseph C. Harrow, San Ramon, CA (US); Lucy Chiu, Fremont, CA (US); Sami Khan, Fremont, CA (US); Wen Huang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 449 days.

(21) Appl. No.: 09/606,968

(22) Filed: Jun. 28, 2000

(51) Int. Cl.[7] .............................................. G06F 9/445
(52) U.S. Cl. .......................................................... 713/2
(58) Field of Search ........................................ 713/1, 2

(56) References Cited

U.S. PATENT DOCUMENTS

| | | | |
|---|---|---|---|
| 5,410,706 A | 4/1995 | Farrand et al. .............. 395/700 |
| 5,596,713 A | 1/1997 | DeRoo et al. ......... 395/183.11 |
| 5,748,940 A | 5/1998 | Angelo et al. ............... 395/490 |
| 5,872,967 A | 2/1999 | DeRoo et al. ............... 395/652 |
| 5,892,943 A | 4/1999 | Rockford et al. ........... 395/652 |
| 5,918,048 A | 6/1999 | Mealey et al. ............... 395/652 |
| 6,473,856 B1 | * 10/2002 | Goodwin et al. ............... 713/2 |

* cited by examiner

Primary Examiner—Thomas M. Heckler
(74) Attorney, Agent, or Firm—Hickman Palermo Truong & Becker LLP

(57) ABSTRACT

A reset pin of a non-volatile read/write memory, which stores boot code, is provided with a reset signal in response to a system reset output by a watchdog timer or other external circuitry. The reset signal causes the non-volatile read/write memory to be placed into read mode. Accordingly, even when a system reset occurs while the non-volatile read/write memory is in write mode, a hang state can be avoided since the memory will be reset to read mode before attempting to read boot code for a reboot operation.

14 Claims, 3 Drawing Sheets

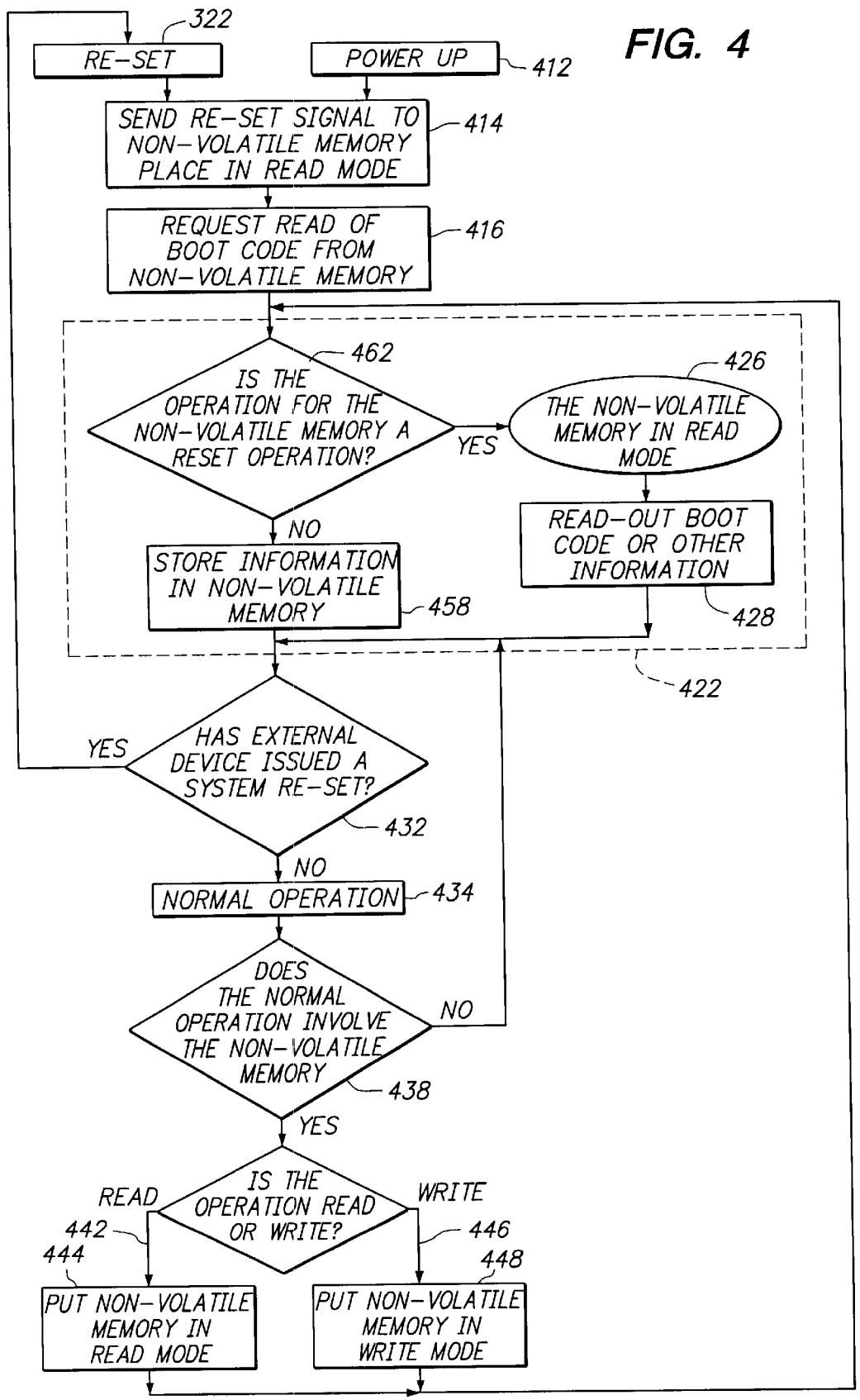

METHOD AND APPARATUS TO USE NON-VOLATILE READ/WRITE MEMORY FOR BOOTSTRAP CODE AND PROCESSES

The present invention is directed to apparatus and methods which facilitate the use of a read/write memory for storing and reading-out bootstrap code, as well as for writing or storing configuration or other information, and in particular to a method and apparatus which can avoid a hangup state of a computer following a system reset.

BACKGROUND INFORMATION

Computers typically execute code known as bootstrap code or boot code, when initially configuring themselves. The boot code typically is executed in response to a power-on operation (sometimes referred to as a "hard boot" or in response to a reset signal (which does not involve cycling power). The reset is sometimes referred to, or analogous to, a "soft reboot" or "warm boot".

A number of systems and devices have been used or proposed for storing the bootstrap code. In general, the bootstrap code must be stored in a non-volatile memory (since the code must be available after the power has been turned off, and then turned on again). In many previous systems, some or all of the bootstrap code was stored on a read-only memory (ROM) device. Because, in normal operation, a read-only device is never written to a read only memory is always in a read state or configuration so that the boot code is substantially always available for reading out from the ROM. There are, however, other types of non-volatile memory, in addition to a read-only memory. These include, for example, flash memory, and electronically erasable, programmable read only memory (EEPROM). Those of skill in the art will be familiar with other types of non-volatile memory.

At least some types of non-volatile memory are read/write memories, i.e., having a capability during normal operation both to output information (i.e., providing memory which can be "read") and to receive and store information (i.e., to "write" information to the memory). Examples of such read/write memory include flash memory and EEPROM.

Because a read/write memory can be in either a read state or write state, at any given time, there is a potential for at least certain read/write memories to cause a computer system to "hang up" (i.e., to be in a state where useful operations or calculations cannot be performed, often requiring performance of a power cycle or hard boot to reconfigure the computer to an operable configuration. In particular, a hang up state becomes a risk when (at least some) read/write non-volatile memories are used for both storing bootstrap code and for writing (i.e., for storing information into the memory). In particular, a hangup operation or state can occur if such a read/write memory is placed into a write state and, while the memory is in a write state, a system reset is performed (e.g., in response to a reset signal sent from an external circuit). The system reset requires that the bootstrap code be accessed and executed before any other software operations can be performed. However, because the non-volatile read/write memory is in a write state, it is impossible to read the bootstrap code out from the read/write memory. It is further impossible to execute any software which might reconfigure the non-volatile write memory into a read state, since such software cannot be executed until after the bootstrap code has been accessed and executed. Accordingly, the system is hung up and typically can only be used by performing a power cycle (which uses hardware, rather than software, to place the non-volatile read/write memory into a read configuration or state).

There are a number of potential advantages associated with using a single memory for both reading-out bootstrap code and for writing configuration (or other) information. In general, use of a single device, rather than providing two or more different devices, lowers the cost of designing and/or fabricating a computer system. Nevertheless, because of the risk of creating a hangup state, many previous systems have either continued to use ROM for storing bootstrap code (and using some other memory device for storing configuration or similar information), or have used two separate read/write non-volatile memory devices, one for reading-out boot code when needed (and which is always maintained in a read state) and another device for storing or writing information during normal operation.

Accordingly, it would be useful to provide a system, method and apparatus which could facilitate the use of a single non-volatile read/write memory for both reading-out stored boot code and for writing information during normal operation. It would further be useful to provide a system, method and apparatus which can reduce or eliminate the occurrence of hangups in response to a reset which occurs after a write operation (to the non-volatile read/write memory).

SUMMARY OF THE INVENTION

The present invention includes a recognition of the existence, source and/or nature of problems in previous approaches, including as described herein.

According to one aspect, circuitry is provided which generates a memory reset signal (or other signal which places the non-volatile read/write memory in a read state) at least in response to a reset (soft boot) signal or operation.

By providing circuitry which does not require execution of the software, in order to place the non-volatile read/write memory in a read state, it is possible to place the non-volatile read/write memory in a read state prior to loading and/or executing bootstrap code, and to thus avoid a hangup state. In one embodiment, external (to the memory) reset circuitry receives or responds to a system reset signal and provides a memory reset signal to, e.g., a reset pin of a non-volatile read/write memory. In this configuration, the support circuitry can function substantially as a relay. In this way, a computer system can be provided with a non-volatile read/write memory which stores bootstrap code and which may be used during normal operation for both read and write operations. However, in response to a system reset (such as might be generated by an external circuit) the support circuit will automatically place the non-volatile read/write circuit or memory into a read mode, and thus bootstrap code stored therein can be read-out for execution as part of the reset operation.

In one aspect, a reset pin of a non-volatile read/write memory, which stores boot code, is provided with a reset signal in response to a system reset output by a watchdog timer or other external circuitry. The reset signal causes the non-volatile read/write memory to be placed into read mode. Accordingly, even when a system reset occurs while the non-volatile read/write memory is in write mode, a hang state can be avoided since the memory will be reset to read mode before attempting to read boot code for a reboot operation.

BRIEF DESCRIPTION OF THE DRAWINGS

FIG. 4 which steps which are identical or analogous to steps shown in FIG. 2 have identical trailing digits in reference numerals, unless otherwise described, is a flow diagram depicting operation of a computer system as depicted in FIG. 3, according to an embodiment of the present invention.

DETAILED DESCRIPTION OF THE PREFERRED EMBODIMENT

Figure 1:
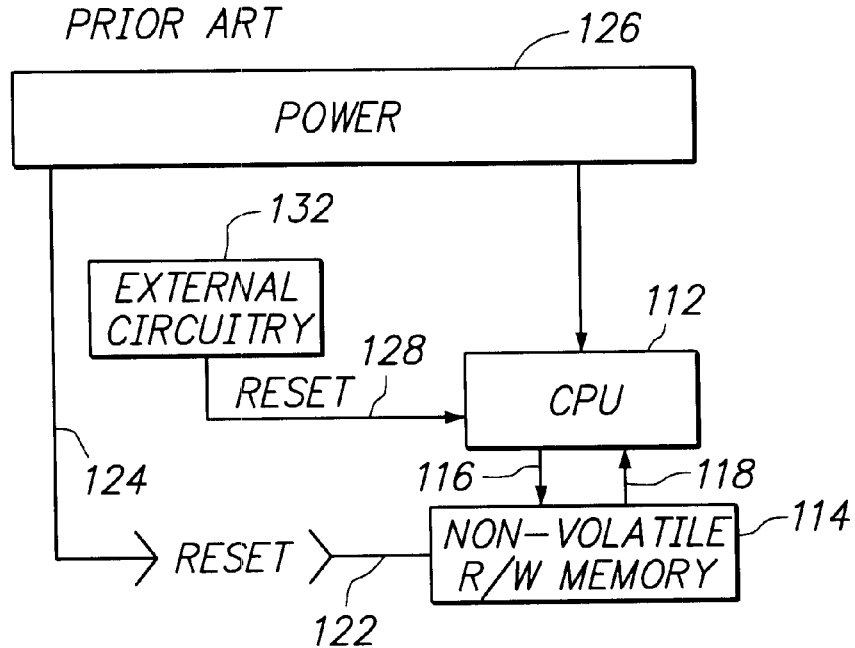
FIG. 1 is a simplified block diagram of a computer system including a non-volatile read/write memory according to previous approaches.
Figure 2:
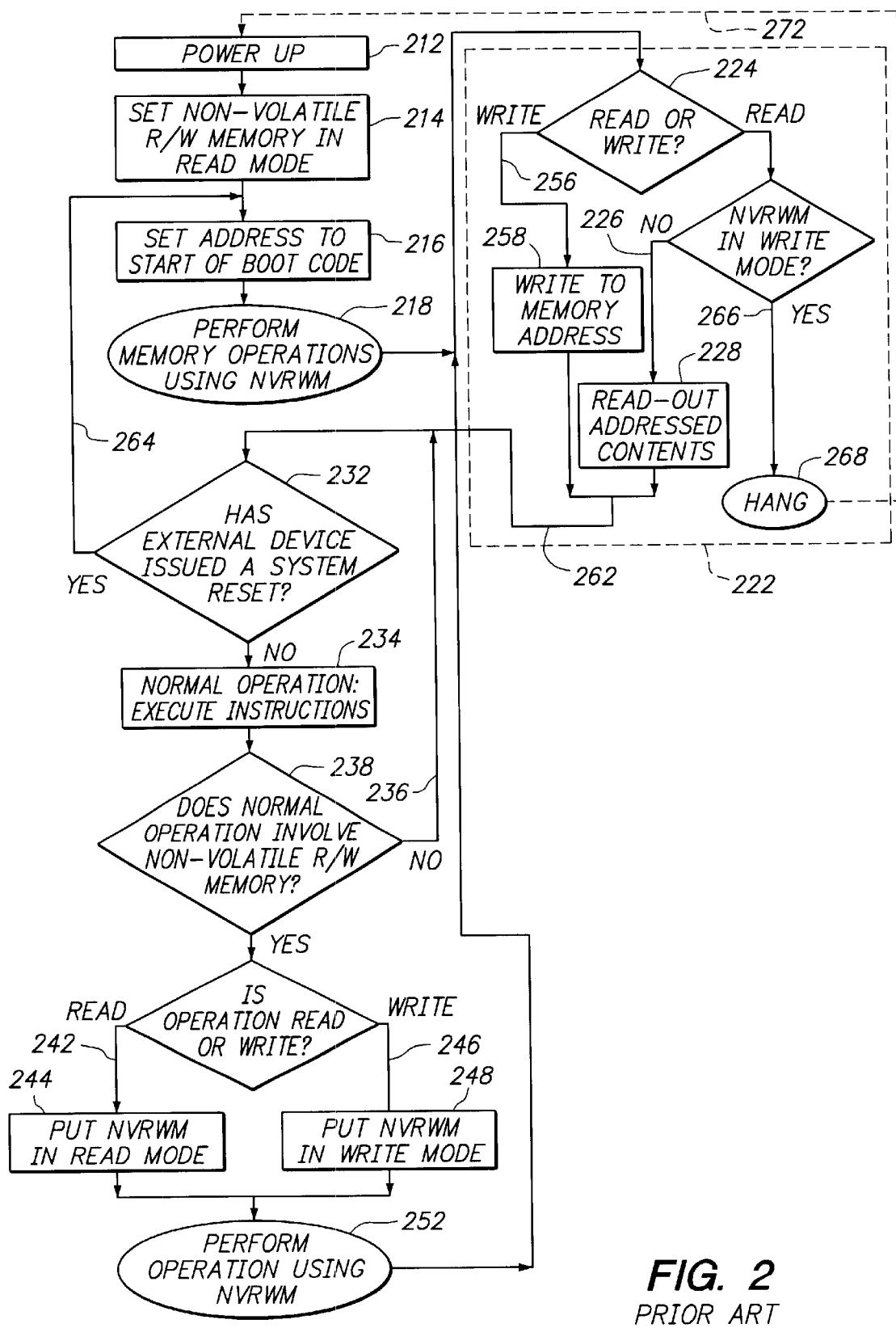
FIG. 2 is a flow chart of a procedure using a non-volatile read/write memory according to previous approaches

FIGS. 1 and 2 depict, in block diagram and flow chart form, a computer system and process according to previous approaches. FIGS. 1 and 2 are simplified illustrations and, although actual systems may have many additional or different components or steps, the simplified illustration of FIGS. 1 and 2 are believed useful in understanding some of the differences between previous approaches and embodiments of the present invention.

Shown in FIG. 1, a central processing unit (CPU) 112 is coupled to a non-volatile read/write memory 114 in fashion to accommodate both write operations 116 and read operations 118. The non-volatile read/write memory 114 can be used for storing, among other things, bootstrap code. The non-volatile read/write memory 114 includes a reset pin or other input 122 which can receive a reset signal 124, e.g., upon initial power up by activating a power button or other control in the system power supply 126. The reset signal 122 provided to the non-volatile read/write memory 114 is different from a reset signal 128 which may be provided to the CPU 112, e.g., from a watchdog timer or other external circuitry 132. The reset signal 128 provided to the CPU 112 causes the CPU 112 to perform a soft reboot, including reading boot code 118 from the non-volatile read/write memory 114. This situation can lead to a hang state if, at the time of the reset signal 128, the non-volatile read/write memory 114 is in a write mode.

Referring to FIG. 2, in response to a power up 212 (i.e., a "hard reset" or "hard boot"). The non-volatile read/write memory 114 will be placed into read mode 214, e.g., in response to a hard reset signal 124. The system can then perform a reboot. In the illustrated example, to perform a reboot, a read address is set to the address of the start of the boot code 216. The system then performs a memory operation 222(in this case a read 224) using the non-volatile read/write memory 218. Because the system has recently performed a power up 212 and thus has set the non-volatile read/write memory in a read mode 214, the system is still in the read mode 226 and thus the addressed contents (in this case the boot code) can be readout 228.

The system is preferably configured to take appropriate actions in response to any system resets issued by the external device 132. Although in the embodiment of FIG. 2, the system frequently or periodically checks or polls the external circuitry 132 to determine if there has been a reset 232, more commonly, an interrupt system is used, allowing external circuitry to interrupt or request performance of a reset by the CPU 112.

In any case, in the absence of a system reset, following boot up, normal operations will be initiated, i.e., executing instructions 234. If the normal operations do not involve the non-volatile read/write memory 236, the system continues to operate, executing instructions 234 unless there has been a system reset 232. However, if the operation involves the non-volatile read/write memory, the CPU will first configure or set the state in the non-volatile read/write memory, i.e., if the operation is a read operation on the non-volatile read/write memory, non-volatile read/write memory 242 will be placed in read mode 244 and if the operation is a write operation 246, the non-volatile read/write memory will be placed in write mode 248. The non-volatile read/write memory operation 222 is then performed 252.

If the non-volatile read/write memory operation is a write operation 256, the Non-volatile read/write memory will have been placed in the write mode 248 and accordingly the Non-volatile read/write memory can write information to the current memory address 258. Following the write operation, the system then returns 262 to check (or permit interruption) if the external device has issued a system reset 232.

If the external device issues a system reset following a write operation, the system 264 will set the memory address to the start of the boot code 216 and attempt to perform a read operation, to read the boot code 218. Since a read operation is requested 224, at a time when the Non-volatile read/write memory is in write mode 266, the system will hang 268. The system then cannot read-out the boot code, because the non-volatile read/write memory (where the boot code resides) is in write mode (since the last operation was a write operation). The system cannot execute any software to reconfigure the non-volatile read/write memory to a read mode, since additional software cannot be executed until after the boot code has been loaded and executed. Accordingly, the only path out of the hang state 268 is to perform a power cycle or hard reset 272.

Figure 3:
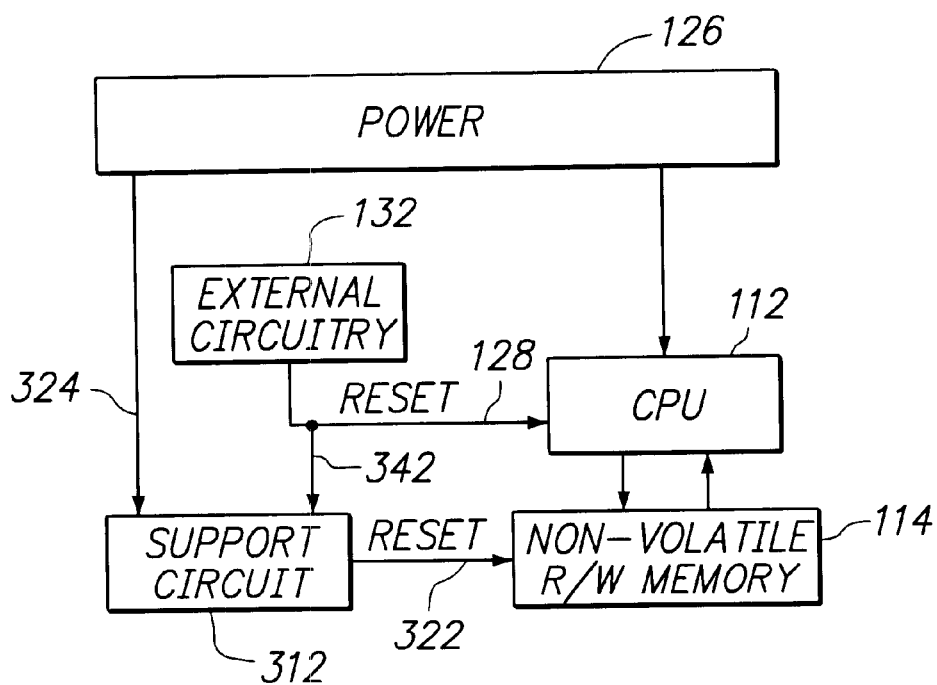
FIG. 3 is a block diagram of a computer system according to an embodiment of the present invention.

In the embodiment of FIG. 3, a support circuit 312 has been provided which outputs a reset signal 322 to the reset pin of a non-volatile read/write memory 114. The support circuit 312 can be configured to operate substantially as a relay, receiving one or more CPU reset signals 324, 342 and, in response, providing a memory reset signal 322 to the non-volatile read/write memory 114. Those of skill in the art will understand how to fabricate or select relay or other circuitry for performing such functions, at least after understanding the present disclosure.

With reference to FIG. 4, as in previous configurations, upon power up 412, the non-volatile read/write memory is placed in (or reverts to) read mode 414 and requests a read boot code 416 from non-volatile memory. Following the operations which result in reading the boot code from the non-volatile read/write memory 422, the system will perform normal operations 434 and check for, or respond to, system resets issued by external devices 432, however, unlike the previous system, in response to an external system reset, 432, the support circuit 312 will receive the external system reset signal 342 and output a reset signal 322 to the non-volatile read/write memory 114. The reset signal 322 places the non-volatile read/write memory 114 in a read state.

Thus, in contrast to the system of FIG. 1, in which a reset from the external circuitry 132 provides a reset signal 128 only to the CPU 112, in the embodiment of FIG. 3, a reset signal 342 is provided to support circuit 312 which places a reset signal 322 on the reset pin of the non-volatile read-write memory 114. Accordingly, when the CPU 112 requests a read of boot code from non-volatile memory 416, regardless of whether the request is a result of a power up 412 or a system reset issued by external circuitry 132, the memory, will be in a read mode 426 when a read operation (including a boot up operation) is to be performed and accordingly it is always possible to read-out boot code or other information 428 and there is no path resulting in a hang state.

As noted above, in FIG. 2, there is a path which results in placing the non-volatile read/write memory in write mode 248, performing a write 258 and performing an external system reset 232 (without resetting the memory to read mode) which results in a hang state 268 when the non-volatile read/write memory is requested to read-out boot code 222 while it is in a write mode 266.

In contrast, there is no such path leading to a hang state in the embodiment of FIG. 4. An external device system reset 432 always causes the support circuit 312 to perform a reset 322, placing the non-volatile read/write memory in read mode 414 before any request to read boot code from the memory 416. Thus, regardless of whether the non-volatile read/write memory is in read mode or in write mode at the time a external device issues a system reset, the non-volatile read/write memory will be placed into read mode by the time the CPU requests a read-out of boot code from the non-volatile read/write memory.

In light of the above description, a number of advantages of the present invention can be seen. The present invention can make it feasible to use a single memory type or component such as non-volatile read/write memory, for providing boot code and for writing or storing information (e.g., configuration or other information) during normal system operation. In at least some embodiments, feasibility of such a system is enhanced by reducing or preventing the occurrence of a hang state, e.g., when the system requests or needs to obtain boot code while the memory is in a write mode. By making it feasible to use a single memory type or component for more than one purpose, the present invention can assist in reducing the number of components used to construct or fabricate a computer system, potentially reducing the cost or complexity required to design, fabricate, maintain and/or use the system. The present invention can increase (or provide) feasibility of using certain computer systems in a remote management (or other remote manner), at least because the present invention can avoid the need for a user intervention (such as the need for user manipulation of a power button or other device) for initiating a power cycle, in response to a hang state.

A number of variations and modifications of the invention can be used. It is possible to use some aspects of the invention without using others. For example, it is possible to provide apparatus, e.g., as depicted in FIG. 3 without using the Non-volatile read/write memory as for storing or writing operations. Although FIG. 3 depicts support circuitry receiving the same reset signal provided to the CPU, it is possible for external circuitry to output two separate reset signals, one for the CPU and one received by support circuitry. If the reset signal output by the external circuitry has a form (e.g., voltage, wave shape or the like) which can be received and recognized by the Non-volatile read/write memory, the reset signal output by the external circuit can be provided directly to the reset pin of the Non-volatile read/write memory, potentially eliminating the need for the support circuitry. It is also possible to configure the system such that the CPU (or other component), in response to receiving a reset signal from the external circuit, then outputs a separate signal to the support circuit (or directly to the non-volatile read/write memory reset pin). Although a watchdog timer was provided as one example of external circuitry which can initiate a system reset, as will be understood by those of skill in the art, other devices can provide system reset signals including, e.g., a WIC card. Although FIG. 4 illustrates a procedure according to one embodiment of the invention, the invention can be practiced by employing other procedures including procedures which have more or fewer (or different) steps than those depicted in FIG. 4 or in which steps are performed in a different order. For example, any procedure which provides a step for assuring the non-volatile read/write memory is in read mode prior to a step of attempting to read boot code and/or following or in response to a system reset interrupt or request can be used. Although FIGS. 1 and 2 depict a reset signal being provided to the non-volatile read/write memory as part of a power cycle, in at least some configurations, it is unnecessary to provide a discreet reset signal to the reset pin, in response to a power up, because the non-volatile read/write memory, in some configurations is configured to always revert to a read mode, as the default mode upon initial power up.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for obtaining bootstrap code in a computer system comprising:

providing a computer system comprising a CPU coupled to a non-volatile read/write memory which stores said boot code and at least indirectly coupled to at least a first external circuit, said non-volatile read/write memory including at least a first reset pin;

outputting at least a first system reset signal from said external circuit; and providing a reset signal at said reset pin to place said non-volatile read/write memory in read mode, without the need for a power cycle; and initiating a read operation for reading boot code from said non-volatile read/write memory after said step of providing to place said non-volatile read/write memory in said read mode.

2. A method, as claimed in claim 1, wherein said reset signal provided to said reset pin is said reset signal output by said external circuit.

3. A method, as claimed in claim 1, further comprising a support circuit coupled to said reset pin, configured for outputting said reset signal to said reset pin.

4. A method, as claimed in claim 3, further comprising outputting said reset signal from said support circuitry in response to said support circuitry receiving said reset signal output by said external circuit.

5. A method, as claimed in claim 3, further comprising said support circuit outputting said reset signal in response to a signal output by said CPU, wherein said signal output by said CPU is output in response to said CPU receiving said reset signal output by said external circuit.

6. Apparatus for obtaining bootstrap code in a computer system having a CPU coupled to a non-volatile read/write memory which stores said boot code and at least indirectly coupled to at least a first external circuit, said non-volatile read/write memory including at least a first reset pin, comprising;

a support circuit which provides a memory reset signal at said reset pin to place said non-volatile read/write memory in read mode, at least indirectly in response to output of a first system reset signal from said external circuit, without the need for a power cycle; and wherein a read operation can be performed for reading boot code from said non-volatile read/write memory in the absence of creating a hang state.

7. Apparatus, as claimed in claim 6 wherein said support circuit outputs said memory reset signal in response to a signal output by said CPU, wherein said signal output by said CPU is output in response to said CPU receiving said system reset signal output by said external circuit.

8. Apparatus for obtaining bootstrap code in a computer system comprising:

a computer system comprising a CPU coupled to a non-volatile read/write memory which stores said boot code and at least indirectly coupled to at least a first external circuit, said non-volatile read/write memory including at least a first reset pin;

means for outputting at least a first system reset signal from said external circuit;

means for providing a memory reset signal at said reset pin to place said non-volatile read/write memory in read mode, without the need for a power cycle; and wherein a read operation can be performed for reading boot code from said non-volatile read/write memory in the absence of creating a hang state.

9. Apparatus, as claimed in claim 8, wherein said memory reset signal provided to said reset pin is said system reset signal output by said external circuit.

10. Apparatus, as claimed in claim 8, wherein said means for providing a memory reset signal comprises a support circuit coupled to said reset pin.

11. Apparatus, as claimed in claim 10, wherein said means for providing a memory reset signal outputs said memory reset signal in response to said means for providing a memory reset signal receiving said system reset signal output by said external circuit.

12. Apparatus, as claimed in claim 10, wherein said means for providing a memory reset signal outputs said memory reset signal in response to a signal output by said CPU, wherein said signal output by said CPU is output in response to said CPU receiving said system reset signal output by said external circuit.

13. A method for obtaining bootstrap code in a computer system having a CPU coupled to a non-volatile read/write memory which stores boot code and at least indirectly coupled to at least a first external circuit, the method comprising:

performing a write operation using said non-volatile read/write memory;

receiving a system reset signal in said CPU, from said external circuit;

placing said non-volatile read-write memory in a read state without the need for a power cycle of said computer system; and reading said boot code from said non-volatile read/write memory, in the absence of a hang state.

14. A computer system with reduced occurrence of hang states comprising:

a CPU coupled to a non-volatile read/write memory which stores boot code and at least indirectly coupled to at least a first external circuit, the computer system configured to perform a write operation using said non-volatile read/write memory;

receive a system reset signal in said CPU, from said external circuit;

place said non-volatile read-write memory in a read state, in response to said system reset signal, without the need for a power cycle of said computer system; and read said boot code from said non-volatile read/write memory, in the absence of a hang state.

\* \* \* \* \*